United States Patent
Powers (10) Patent No.: US 9,754,023 B2
(45) Date of Patent: Sep. 5, 2017

(54) STOCHASTIC DOCUMENT CLUSTERING USING RARE FEATURES

(71) Applicant: Securboration, Inc., Melbourne, FL (US)

(72) Inventor: Joshua Powers, Reston, VA (US)

(73) Assignee: SECURBORATION, INC., Melbourne, FL (US)

( * ) Notice: Subject to any disclaimer, the term of this patent is extended or adjusted under 35 U.S.C. 154(b) by 0 days.

(21) Appl. No.: 15/018,242

(22) Filed: Feb. 8, 2016

(65) Prior Publication Data

US 2016/0299907 A1    Oct. 13, 2016

Related U.S. Application Data

(63) Continuation of application No. 14/081,790, filed on Nov. 15, 2013, now Pat. No. 9,256,669.

(60) Provisional application No. 61/727,352, filed on Nov. 16, 2012.

(51) Int. Cl.
  *G06F 17/30* (2006.01)

(52) U.S. Cl.
  CPC .... *G06F 17/3071* (2013.01); *G06F 17/30705* (2013.01); *G06F 17/30713* (2013.01)

(58) Field of Classification Search
  CPC .......... G06F 17/3071; G06F 17/30713; G06F 17/30; G06F 17/30575; G06F 17/30705
  USPC ................................................ 707/600–899
  See application file for complete search history.

(56) References Cited

U.S. PATENT DOCUMENTS 6,119,124 A  *  9/2000  Broder ................ G06F 17/3071
9,256,669 B2     2/2016  Powers

OTHER PUBLICATIONS

U.S. Appl. No. 14/081,790, Amendment and Response filed Sep. 4, 2015, 10 pages.
U.S. Appl. No. 14/081,790, Notice of Allowance mailed Oct. 1, 2015, 5 pages.
U.S. Appl. No. 14/081,790, Office Action mailed Jul. 22, 2015, 7 pages.

* cited by examiner

*Primary Examiner* — Isaac M Woo (57) ABSTRACT

Systems, methods, and apparatus for clustering resources using rare features are provided. For example, an environment includes an extraction module, an index module, and a cluster module. The extractions module identifies a set of resources and extracts a plurality of features from the resources. The plurality of features may be rare features. The index module identifies and generates a rare features index. The cluster module identifies at least two resources that share rare features, creates one or more clusters based on the identified at least two resources, and associates resources that share similar features with the one or more clusters. Resources that do not share similar features are not associated with the one or more clusters. Identifying at least two resources that share rare features is based at least upon a threshold.

20 Claims, 6 Drawing Sheets

STOCHASTIC DOCUMENT CLUSTERING USING RARE FEATURES

CROSS-REFERENCE TO RELATED APPLICATIONS

This Application claims priority to U.S. patent application Ser. No. 14/081,790, entitled "STOCHASTIC DOCUMENT CLUSTERING USING RARE FEATURES", filed Nov. 15, 2013, now issued U.S. Pat. No. 9,256,669, which claims priority to U.S. Provisional Patent Application No. 61/727,352 entitled "Stochastic Document Clustering Using Rare Features," filed Nov. 16, 2012. The above-referenced Applications are hereby incorporated by reference in their entirety.

BACKGROUND

Document clustering is a method used to organize large sets of resources into smaller sets which have been algorithmically determined to be similar. Current clustering algorithms bias toward constructing a few very large clusters of resources. As a result, the relationships that define each individual cluster may be broadened to make sure each resource is included in one of the clusters. This degrades the quality of the relationship between the resources grouped into each cluster. In turn, the generated clusters do not provide as strong of an efficiency gain for indexing, searching, organizing, etc.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

In one aspect the technology relates to organizing resources using rare features. In one embodiment, a method may include identifying a set of resources, extracting a plurality of features from the resources, identifying at least two resources that share rare features, creating one or more clusters based on the identified at least two resources, and associating resources that share similar features with the one or more clusters. In one embodiment, the plurality of features are rare features. The rare features may not include stop words. The rare features may include metadata. The metadata may include at least one of a Uniform Resource Locator, a title, an author, a language, etc. In one embodiment, the identification may be based at least upon a threshold. In one embodiment, resources that do not share similar features are not associated with the one or more clusters. In embodiments, at least one resource from the set of resources includes a cluster. The method may further comprise a controlled vocabulary used in conjunction with the rare features.

In one embodiment, a method for associating resources that share similar features with the one or more clusters may include selecting a pair of resources that share at least one rare feature, comparing the pair of resources, and merging the pair of resources into a single cluster, based upon the comparison. The pair of resources may include at least two of a document, an email, a cluster, a passage, a tweet, an audio transcript, a wall post, or any other type of computing resource.

In one embodiment, a method for comparing the pair of resources may include determining a similarity score by adding a first plurality of scores related to shared features of the pair of resources and subtracting a plurality of scores related to features unique to each resource in the pair.

In one embodiment, a computer storage medium encoding computer executable instructions that, when executed by at least one processor, perform a method of organizing resources, the method may include identifying a set of resources, extracting a plurality of features from the resources, identifying at least two resources that share rare features, creating one or more clusters based on the identified at least two resources, and associating resources that share similar features with the one or more clusters. In one embodiment, the plurality of features are rare features. The rare features may not include stop words. The rare features may include a named entity, unique word or characteristic, metadata, etc. The metadata may include data related to a Uniform Resource Locator, a title, an author, a language, a time, a location, etc. In one embodiment, the identification is based at least upon a threshold. In one embodiment, resources that do not share similar features may not be associated with the one or more clusters. The method may further comprise a controlled vocabulary used in conjunction with the rare features.

In one embodiment, a computer storage medium encoding computer executable instructions that, when executed by at least one processor, perform a method of associating resources that share similar features with the one or more clusters, the method may include selecting a pair of resources that share at least one rare feature, determining a similarity score by adding a first plurality of scores related to shared features of the pair of resources and subtracting a plurality of scores related to features unique to each resource in the pair, and merging the pair of resources into a single cluster if the similarity score meets a similarity threshold. The pair of resources may include at least two of a document, an email, a cluster, a passage, a tweet, an audio transcript, a wall post, etc.

In one embodiment, a system may include a processor and a memory. The memory may be for encoding computer executable instructions that, when executed by the processor, performs a method of organizing resources. The method performed may include identifying a set of resources, extracting a plurality of features from the resources, identifying at least two resources that share rare features, creating one or more clusters based on the identified at least two resources, and associating resources that share similar features with the one or more clusters. In one embodiment, the plurality of features are rare features. The rare features may include metadata. The metadata may include data related to a Uniform Resource Locator, a title, an author, a language, etc. In one embodiment, the identification is based at least upon a threshold. In one embodiment, resources that do not share similar features are not associated with the one or more clusters.

In one embodiment, a system may include a processor and a memory. The memory may be for encoding computer executable instructions that, when executed by the processor, performs a method of associating resources that share similar features with the one or more clusters. The method performed may include selecting a pair of resources that share at least one rare feature, comparing the pair of resources, and merging the pair of resources into a single cluster based upon the comparison and if a similarity threshold is met. The pair of resources may include at least two of a document, an email, a cluster, a passage, a tweet, an audio transcript, a wall post, a cluster, etc.

In one embodiment, a system may include a processor and a memory. The memory may be for encoding computer executable instructions that, when executed by the processor, performs a method of comparing the pair of resources. The method performed may include determining a similarity score by adding a first plurality of scores related to shared features of the pair of resources and subtracting a plurality of scores related to features unique to each resource in the pair.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following Figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The present disclosure generally relates to resource clustering using rare features. Existing techniques for resource clustering typically include clustering over an entire resource space and/or feature space within a collection of resources. Resource space may include all resources. For example, if the resource is a text document, the resource space would include all of the text of the document. If the resource is a cluster, the resource space may include all of the features of resources grouped in the cluster (e.g., features of documents, audio transcripts, etc.). Feature space may include all of the features desired to be extracted from the resources. For example, all features whose occurrences in the resources occur in a distribution may be a feature space. This may result in producing a few very large clusters of resources and a comparison technique that is not optimal. Accordingly, embodiments described herein include systems and methods for clustering resources using rare feature selection. In turn, the number of comparisons required to obtain the desired number and/or granularity of resource clusters may be significantly reduced.

Figure 1:
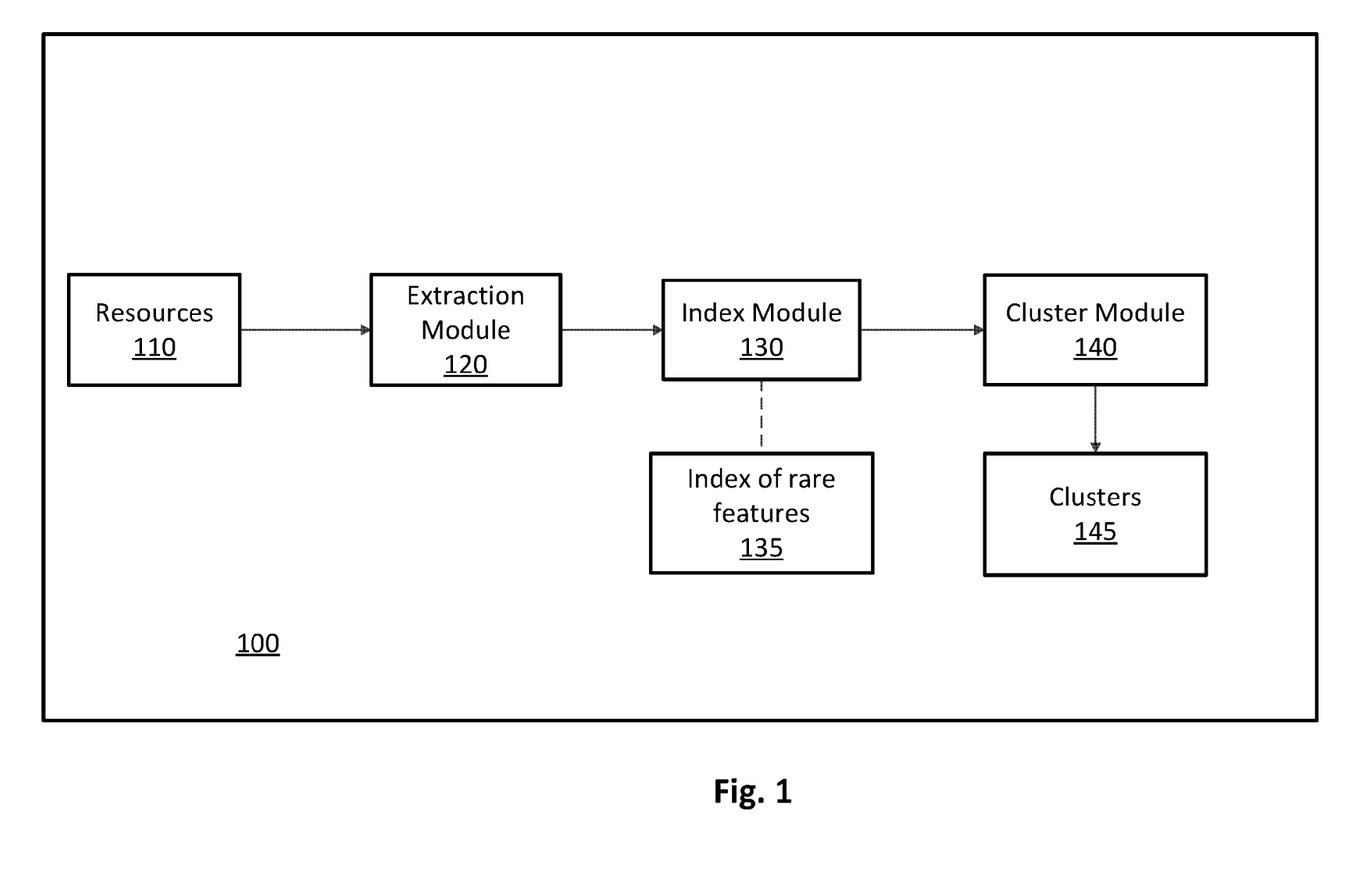
FIG. 1 is a block diagram illustrating an operating environment for clustering resources using rare features according to an embodiment of the present disclosure.

FIG. 1 illustrates an operating environment 100 for clustering resources using rare features according to one or more embodiments. As shown in FIG. 1, the operating environment 100 may include resources 110, an extraction module 120, an index module 130, a cluster module 140, and clusters 145. In one example, a module may be performed by hardware, software, or a combination of hardware and software. The index module 130 may include a rare features index 135. The resources 110 may be any resource and/or any combination of resources containing text. For example, the resources 110 may include at least one of a text document, a passage from a text document, an audio or video transcript, an audio or video file, a digital photo file, a web page, an email, a cluster, a tweet, and a wall post, to name a few.

The extraction module 120 may include at least one computer program for extracting a plurality of features from the resources 110 and creating a set of feature bags based on extracting the plurality of features from the resources 110. As such, a set of resources 110 may be identified by the extraction module 120 for extracting a plurality of features from the set of resource 110. The plurality of features may include any feature whose occurrences in the resources 110 occur in a power-law-like distribution. A power-law-like distribution is a functional relationship between two quantities, where one quantity varies as a power of another. A power-law-like distribution may include the Zipf-like distribution, the Pareto distribution, the Zeta distribution, the Yule-Simon distribution, the Student's t-distribution, etc. For example, the plurality of features may include n-grams, metadata, named entities, noun phrases, and/or words or categories from a controlled vocabulary such as a thesaurus or ontology. In one example, n-grams may be a contiguous sequence of n items from a given sequence found in the resource 110 text, where n is a number (e.g., 1, 2 or 3). The items may include phonemes, syllables, letters, words or base pairs. In one embodiment, stop words (e.g., the, is, and also) are excluded from the possible n-gram outputs. Stop words are any n-gram that commonly occurs across a body of resources. For example, the word "patent" could be an n-gram when the body of resources is from a patent law firm. In one example, metadata may include a Uniform Resource Locator, a title, an author, and a language of the resources 110, to name a few. Named entities may include predefined categories such as the names of persons, organizations, locations, expressions of times, quantities, monetary values, and percentages, to name a few. As such, the extractor module 120 may be trained to identify named entities by using sample data from the application domain of resources 110. Categories from a controlled vocabulary may normalize highly-variable textual surface forms to uniquely identified words, phrases, or URIs. For example, 'New York City' and 'The Big Apple' would be identified as text forms that mean the same thing.

As discussed above, the extraction module 120 may be configured to create a set of feature bags based on extracting the plurality of features from the resources 110. As such, the set of feature bags may be indexed by the index module 130. The index module 130 may be configured to identify and generate a rare features index 135. The rare features index 135 may include feature to resource pointers, a rare feature list, term frequency-inverse document frequency (TF-IDF) statistics for each feature found in each resource 110, and feature counts within each resource 110 and within the entire corpus. The feature to resource pointers point from the feature to the resources 110 that include the feature. The rare feature list includes a list of rare features which may be determined by a rare feature threshold that is greater than 1. For example, a rare feature may be a feature that is shared by a pair of resources. The threshold may be based on how often a feature is found in a resource and/or how often a feature is found in a set of resources. As such, in one example, the threshold may include the number of times the feature is found in a resource. In another example, the threshold may include the number of resources in which the feature is found. The TF-IDF is a calculated score for a resource 110 that indicates the strength of the resource's association with a feature relative to that feature's overall presence in the corpus. Term Frequency (TF) is a weighted measure of the number of times that the term (e.g., feature) appears in a single resource 110. Inverse Document Frequency (IDF) is used to identify if a term (e.g., feature) is rare across the entire corpus. IDF may be calculated using a variety of methods. In embodiments, the methods account for the entire corpus size and may be log-based. The TF-IDF score may be calculated by multiplying TF by IDF or by calculating the TF and IDF log sums.

After the rare features index 135 is generated by the index module 130, the cluster module 140 may be configured to create clusters 145. As such, the cluster module 140 may search through the rare features index 135 and identify at least two resources 110 that share rare features. The cluster module 140 may be configured to randomly select a rare feature from the rare features index 135. After the cluster module 140 randomly selects a rare feature from the rare features index 135, the cluster module 140 may randomly select two resources 110 that share the randomly selected feature. In one embodiment, the cluster module 140 may be configured to select a rare feature from the rare feature index 135 based at least upon a threshold. The threshold may be a parameter of the system. For example, the threshold must be greater than 1 and less than the rare feature threshold. The rare feature threshold is the threshold used to generate the rare features list by the index module 130. The pair of resources may be compared by adding the TF-IDF scores of all features that are shared by the pair of resources and subtracting the TF-IDF scores of all features that are unique to each resource 110 in the pair of resources. The comparison of the pair of resources may be weighted by additional factors such as metadata comparisons and/or normalization of pairs of disparately sized resources 110.

If a similarity threshold is met based on the comparison of the pair of resources, the pair of compared resources may be merged into a single cluster 145. The rare features index 135 may be updated to include the results of the compared resources, which may change statistical measures of features such as rarity and TF-IDF for the entire corpus. However, in embodiments, to maintain desirable performance characteristics, the statistical measures are not recalculated for the entire corpus. Instead, a cached index of differences caused by clustering may be saved and any subsequent queries against the index for rare features, resources, or TF-IDF statistics may be adjusted. Merging a pair of compared resources into a single cluster 145 creates new clusters 145 (e.g., the clusters 145 have been updated). As such, another rare feature may be selected, another pair of resources may be selected, and another comparison may be performed. If the similarity threshold is not met, an attempt count may be incremented and a failure limit may be tested (e.g., to see if the failure limit has been reached). In one example, the failure limit is a set number of times the similarity threshold is not met during the comparison of pairs of resources. If the failure limit has not been reached, then another rare feature may be selected, another pair of resources may be selected, and another comparison may be performed. This process may be repeated until a parameterizable criteria is met or the failure limit has been reached. The parameterizable criteria may include a goal number of clusters 145, a goal threshold cluster distance, and a number of pair selections, to name a few.

At the end of the clustering process, all of the resources 110 may either be in a cluster 145 or a leftover resource (e.g., a resource 110 that is not tied to any cluster 145). As a result, some resources 110 may be in multiple clusters 145 and some resources 110 may not be included in any clusters 145. Having leftover resources may provide the formation of many clusters 145 of highly-similar resources resulting in optimal comparison performance. In some embodiments, a post-process may be executed. The post-process may include comparing the leftover resource to each created cluster 145 to determine if there is a relatively strong match possibility that was not discovered during the clustering process. If it is determined that the similarity threshold is met, the leftover resource may be added to the created clusters 145.

Figure 2:
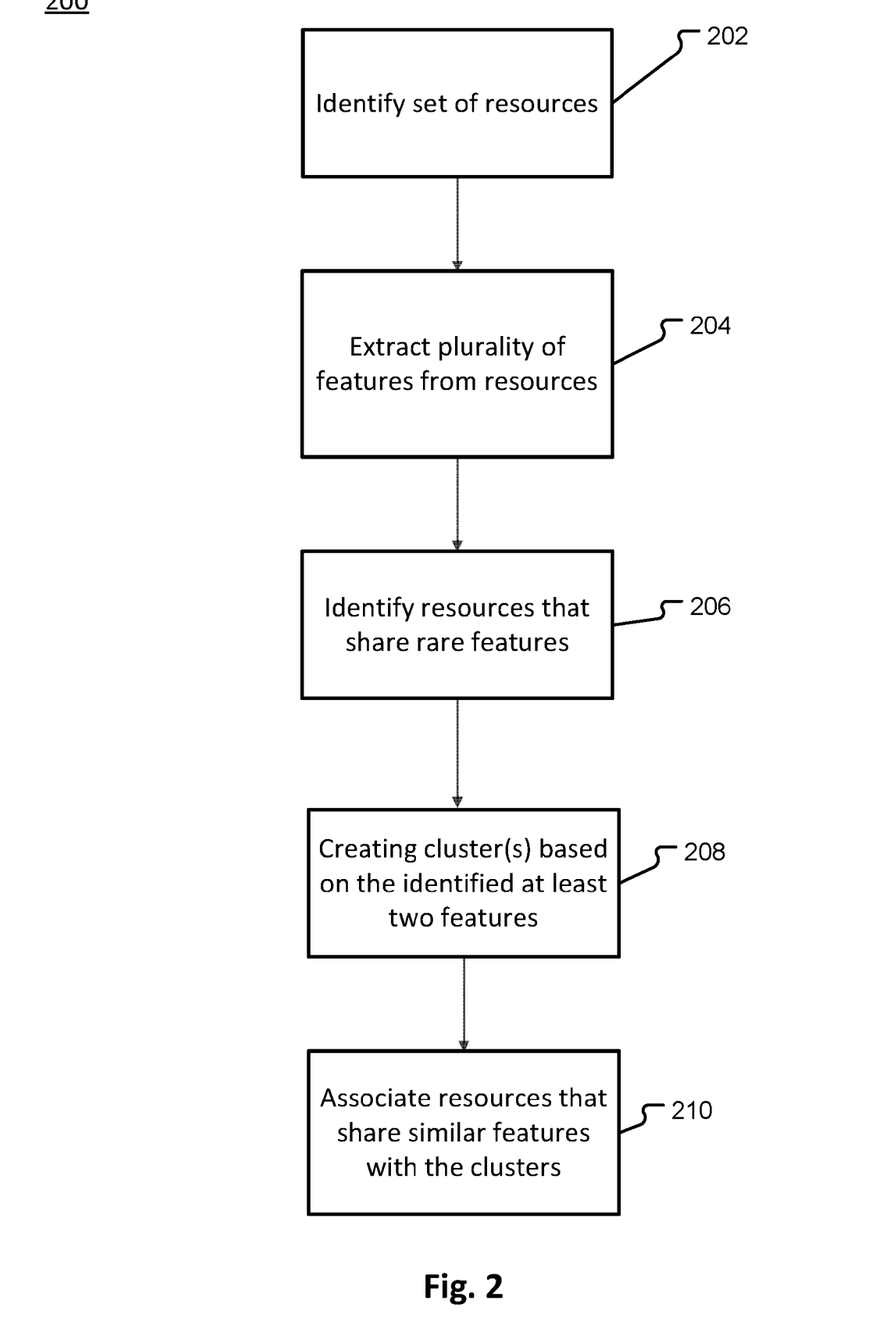
FIG. 2 is a flow diagram illustrating operations for organizing resources using rare features according to a first embodiment of the present disclosure.

FIG. 2 illustrates a method 200 for organizing resources using rare features according to one or more embodiments of the present disclosure. Method 200 begins at operation 202 in which a set of resources are identified. For example, the set of resources may include any resource and/or any combination of resources containing text, metadata, or other data or features that can be categorized. For example, the set of resources may include at least one of a text document, a passage from a text document, an audio or video transcript, an audio or video file, a digital photo file, a web page, an email, a cluster, a tweet, and a wall post, to name a few. As such, a set of resources are identified to be organized (e.g., to potentially be placed in a cluster) using rare features of the resources. In one embodiment, at least one resource from the set of resources may include a cluster.

Method 200 continues to operation 204 in which the plurality of features from the resources are extracted. For example, the extraction module may extract a plurality of features from the resources and create a set of feature bags based on extracting the plurality of features from the resources. The plurality of features may include any feature whose occurrences in the resources will occur in a Zipf-like distribution, the Pareto distribution, the Zeta distribution, the Yule-Simon distribution, the Student's t-distribution, etc. For example, the plurality of features may include n-grams, metadata, named entities, noun phrases, and categories from a controlled vocabulary such as a thesaurus or ontology.

At operation 206, at least two resources that share rare features are identified. Identification of the at least two resources that share rare features may be based on a threshold. For example, rarity of a feature may be determined by how often a feature is found in a resource and/or how often a feature is found in a set of resources. As such, in one example, the threshold may include the number of times the feature is found in a resource. In another example, the threshold may include the number of resources in which the feature is found. If the threshold is met and/or exceeded, then the feature is not rare.

At operation 208, one or more clusters are created based on the identified at least two resources. For example, when two resources share rare features, a cluster may be created that includes those two resources such that the cluster includes resources that are highly-similar based on the shared rare features. In this regard, many clusters of highly-similar resources may be created. Because many clusters are created based on rare features, fewer comparisons are required while creating clusters and when a search is performed. This may result in efficient and optimized organization of resources.

After one or more clusters are created, flow proceeds to operation 210 where resources that share similar features with the one or more clusters are associated with one or more clusters and resources that do not share similar features are not associated with the one or more clusters. For example, a pair of resources that share at least one rare feature may be selected, the pair of resources may be compared for similarity, and if a similarity threshold is met, the pair of resources may be merged with the one or more clusters such that a new, larger cluster is created.

Figure 3:
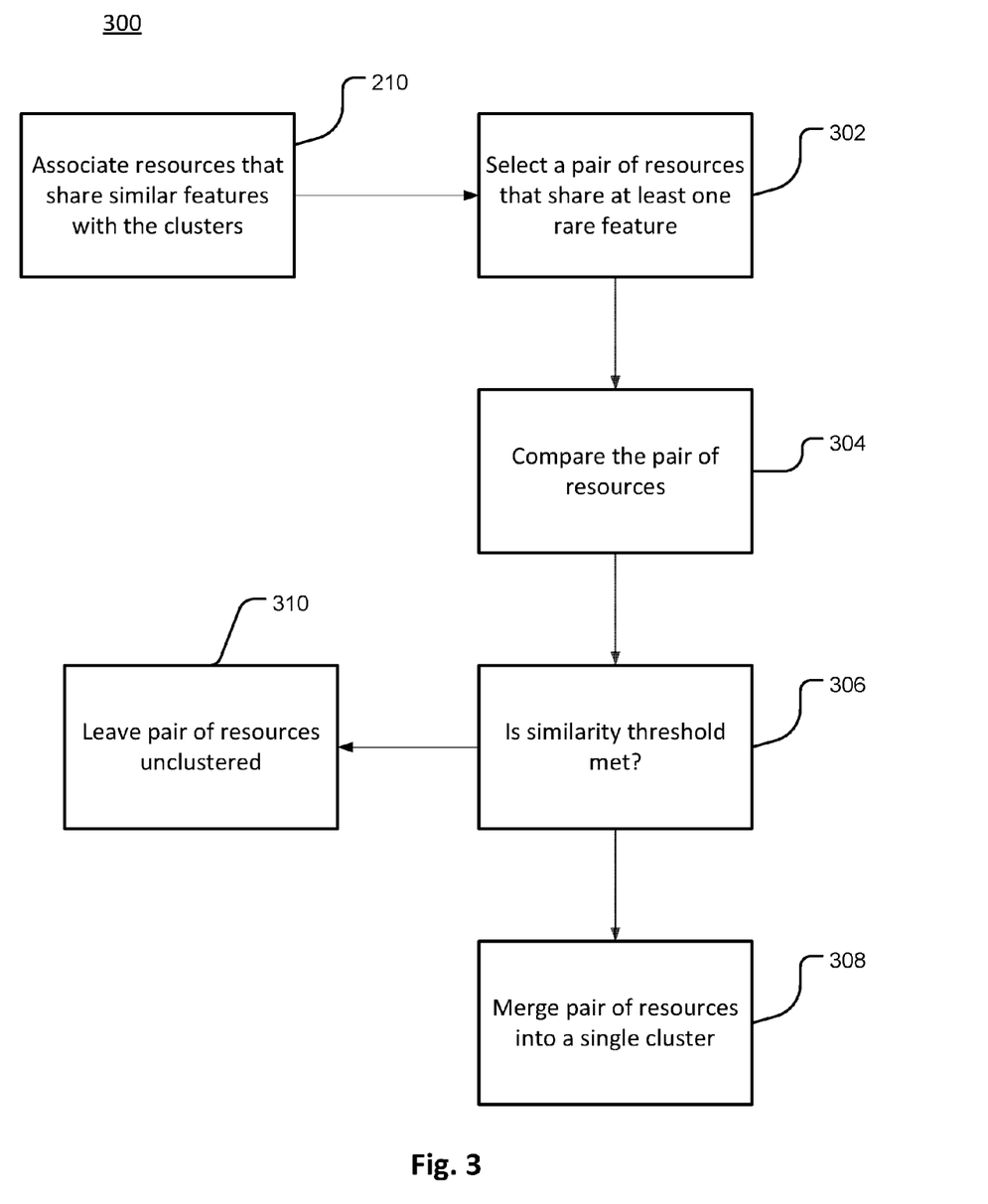
FIG. 3 is a flow diagram illustrating operations for associating resources that share similar features with one or more clusters according to a first embodiment of the present disclosure.

FIG. 3 illustrates a method 300 for associating resources that share similar features with one or more clusters (e.g., operation 210 of FIG. 2) according to one or more embodiments of the present disclosure. In one embodiment, a method 300 begins at operation 302 in which a pair of resources is selected that share at least one rare feature. For example, the cluster module may randomly select a rare feature from the rare features index. After the cluster module selects a rare feature from the rare features index, the cluster module may randomly select two resources (e.g., a pair of resources) that share the selected rare feature.

At operation 304, the pair of resources may be compared for similarity. For example, the pair of resources may be compared by determining a similarity score. The similarity score may be determined by adding the TF-IDF scores of all features that are shared by the pair of resources and subtracting the TF-IDF scores of all features that are unique to each resource in the pair of resources. This comparison may result in determining whether the pair of resources meets a similarity threshold.

At operation 306, when a similarity threshold is met, flow proceeds to operation 308 where, based on the comparison, the pair of resources is merged into a single cluster. It may be determined whether the similarity threshold is met by whether the similarity score is greater than the similarity threshold. The similarity threshold may be based on the strength of the resource's association with a feature relative to that feature's overall presence in the corpus. For example, the similarity threshold may be based on a weighed comparison of the overlap of the shared features between the pair of resources. The weighed comparison may be based on TF-IDF scores, log likelihood, measure of association statistics, etc. Merging a pair of compared resources into a single cluster creates new clusters (e.g., the clusters have been updated or a new cluster is created).

At operation 306, when a similarity threshold is not met, flow proceeds to operation 310 where the pair of resources is not merged into a single cluster. For example, the resources that are not merged into a cluster are leftovers (e.g., resources that are not tied to any cluster). As a result, some resources may be in multiple clusters and some resources may not be included in any cluster (e.g., the leftover resources). If the similarity threshold is not met, an attempt count may be incremented and a failure limit may be tested (e.g., to see if the failure limit has been reached).

Figure 4:
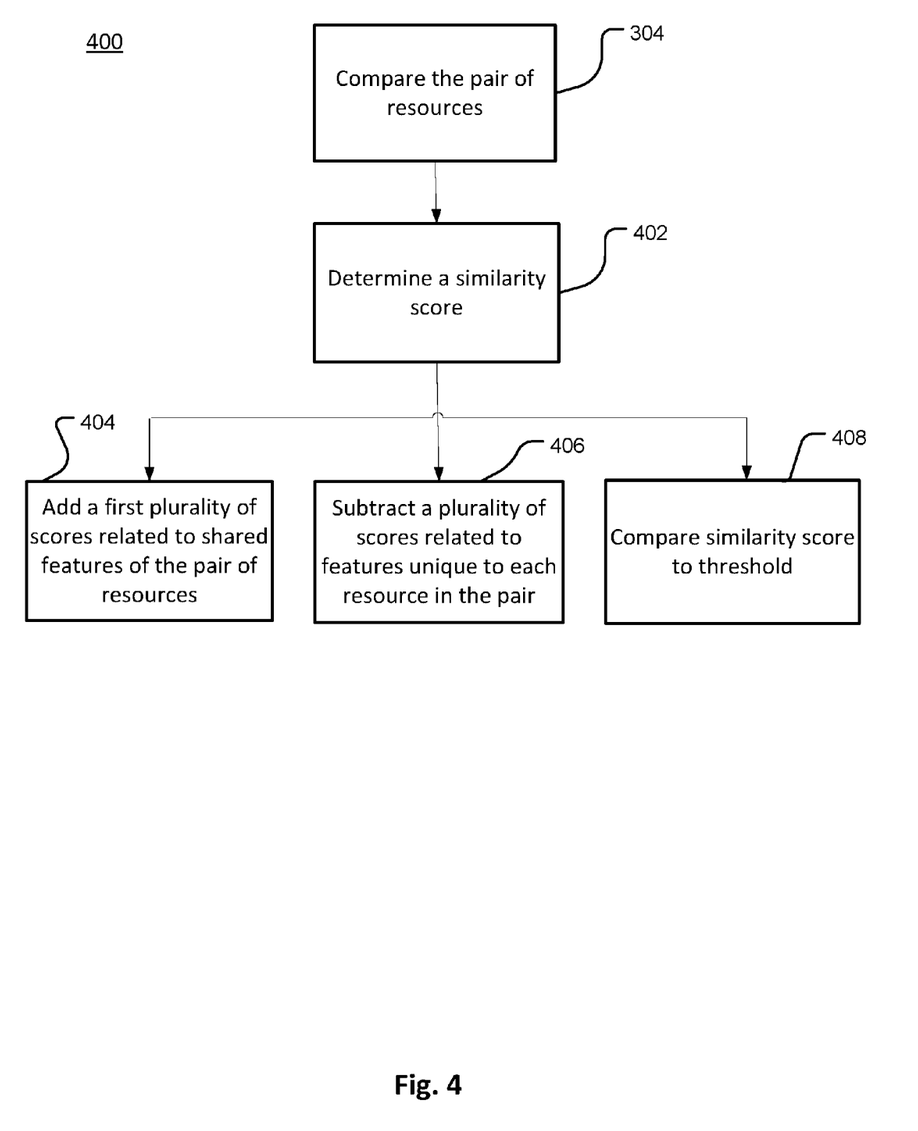
FIG. 4 is a flow diagram illustrating operations for comparing a pair of resources for similarity according to a first embodiment of the present disclosure.

FIG. 4 illustrates a method 400 for comparing the pair of resources for similarity (e.g., operation 304 of FIG. 3) according to one or more embodiments of the present disclosure. In one embodiment, a method 400 begins at operation 402 in which a similarity score is determined. The similarity score (e.g., TF-IDF score) is a calculated score for a resource that indicates the strength of the resource's association with a feature relative to that feature's overall presence in the corpus. Term Frequency (TF) is a weighted measure of the number of times that the term (e.g., feature) appears in a single resource. Inverse Document Frequency (IDF) is used to identify if a term (e.g., feature) is rare across the entire corpus. IDF may be calculated using a variety of methods. The methods must account for the entire corpus size and may be log-based. The TF-IDF score is calculated by multiplying TF by IDF or by calculating the TF and IDF log sums.

Flow proceeds to operations 404, 406, and 408 to determine the similarity score. At operation 404, a first plurality of scores (e.g., TF-IDF scores) related to shared features of the pair of resources are added. For example, the rare features index includes TF-IDF statistics for each feature found in each resource. As such, each TF-IDF score for each shared feature of the pair of resources located in the rare features index is added together. At operation 406, a plurality of scores (e.g., TF-IDF scores) related to features unique to each resource in the pair are subtracted from the added TF-IDF scores from operation 404. For example, the features unique to each resource in the pair are identified and their corresponding TF-IDF scores located in the rare features index are added together. The sum of these TF-IDF scores are then subtracted from the sum of the TF-IDF scores of operation 404 to determine a similarity score. Flow then proceeds to operation 408 where the similarity score is compared to the similarity threshold. If the similarity score meets and/or exceeds the similarity threshold, then the pair of resources is considered similar for merging purposes (as discussed in operation 308).

Figure 5:
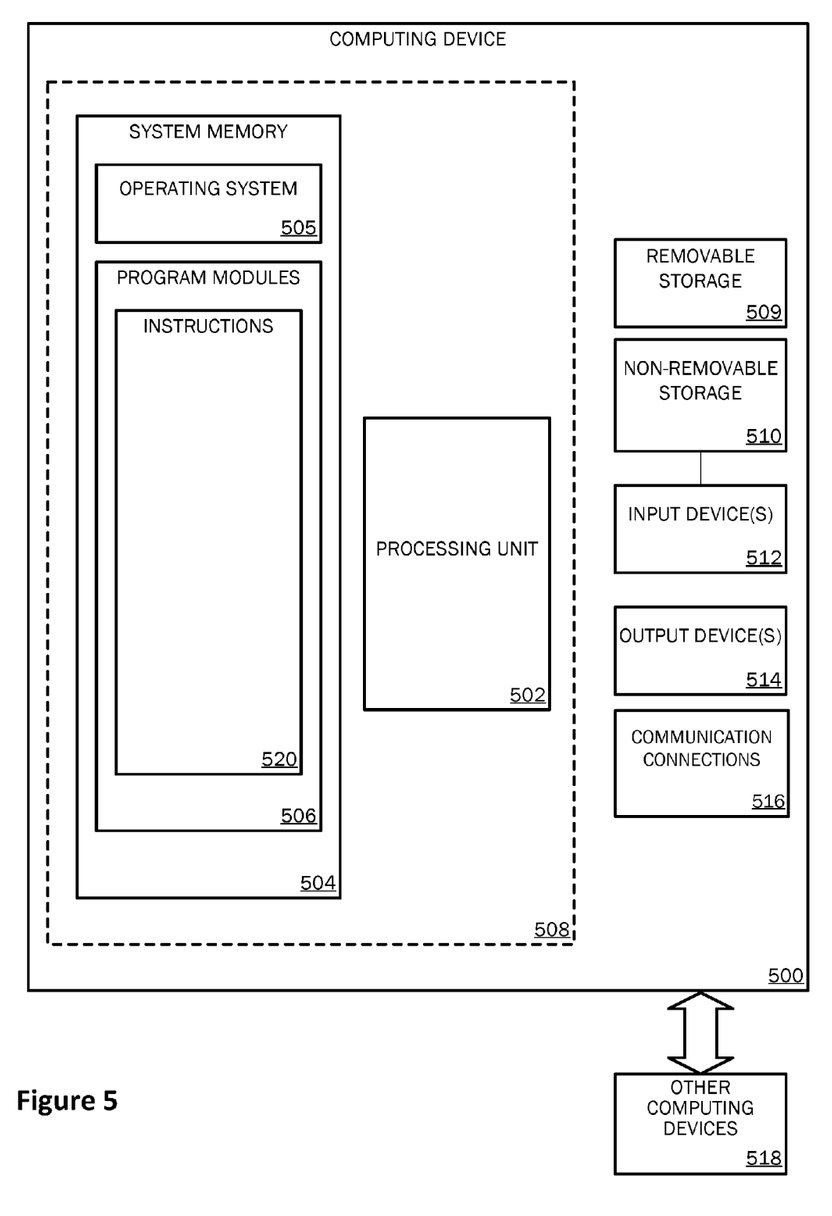
FIG. 5 is a block diagram illustrating physical components (e.g., hardware) of a computing device according to an embodiment of the present disclosure.
Figure 6:
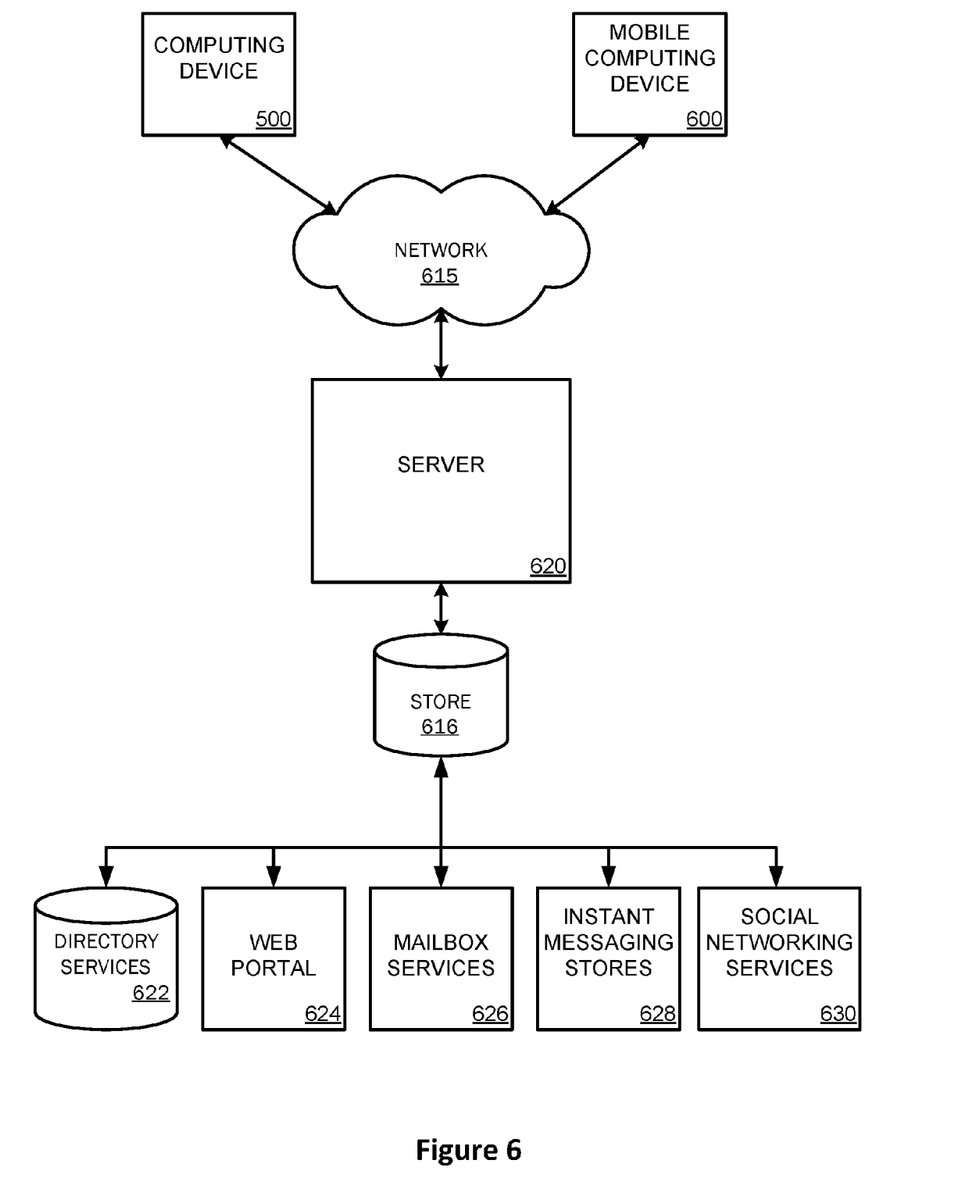
FIG. 6 is a block diagram illustrating a system for transferring data between different computing devices according to an embodiment of the present disclosure.

FIGS. 5-6 and the associated descriptions provide a discussion of a variety of operating environments in which embodiments of the present disclosure may be practiced. However, the devices and systems illustrated and discussed with respect to FIGS. 5-6 are for purposes of example and illustration and are not limiting of a vast number of computing device configurations that may be utilized for practicing embodiments described herein.

FIG. 5 is a block diagram illustrating physical components (e.g., hardware) of a computing device 500 with which embodiments of the present disclosure may be practiced. The computing device components described below may be suitable for the computing environment 100 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software instructions for clustering 520 or other code that is to be analyzed for clustering purposes. The software instructions for clustering 520 may be suitable for performing embodiments of the present disclosure including those described above in conjunction with FIGS. 1-4. The operating system 505, for example, may be suitable for controlling the operation of the computing device 500. Furthermore, embodiments of the present disclosure may be practiced in conjunction with other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods described above in conjunction with FIGS. 2-4. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry, universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 illustrates one embodiment of the architecture of a system for transferring data between different computing devices including computing device 600 and mobile computing device 600. Data may be transferred between a client computing device and another computing device, such as, for example, a server computing device. Additionally, the data may be stored in different communication channels or other storage types. For example, various features, documents, resources, statistics and the like, may be stored using a directory service 622, a web portal 624, a mailbox service 626, an instant messaging store 628, or a social networking site 630. A server 620 may provide data to and from client computing device 500. As one example, the server 620 may be a web server. The server 620 may provide data to a computing device 500 or the mobile computing device 600 over the web through a network 615. By way of example, the operating environment described above with respect to FIG. 1 may be embodied in a personal computer, a tablet computing device and/or a mobile computing device 600 (e.g., a smart phone). Any of these embodiments may obtain content from the store 616.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

I claim:

1. A system comprising:
    at least one processor;
    memory encoding computer executable instructions that, when executed by at least one processor, perform a method of organizing resources, the method comprising:
        identifying a plurality of features from a set of resources;
        determining one or more of the plurality of features is a rare feature;
        adding the one or more rare features to a rare feature index;
        extracting the one or more rare features from the set of resources;
        identifying at least two resources that share the one or more rare features;
        comparing the at least two resources using a similarity threshold; and
        when the similarity threshold is met, merging the at least two resources into a single cluster.

2. The system of claim 1, wherein determining the rare feature comprises determining at least one of:
    a number of times a feature is found in a resource, and
    a number of times the feature is found in the set of resources.

3. The system of claim 2, wherein the feature is determined to be the rare feature when:
    the number of times the feature is found in the resource is below a threshold; or
    the number of times the feature is found in the set of resource is below the threshold.

4. The system of claim 1, wherein the rare feature index comprises at least one of:
    one or more feature to resource pointers;
    a rare feature list;
    term frequency-inverse document frequency (TF-IDF) statistics for one or more rare features;
    feature counts for one or more resources in the set of resources; and
    feature counts for the set of resources.

5. The system of claim 1, wherein identifying the at least two resources comprises:
    randomly selecting one or more rare features from the rare feature index; and
    randomly selecting the at least two resources that share the one or more rare features.

6. The system of claim 5, wherein the randomly selected one or more rare features are selected based at least upon a threshold, the threshold corresponding to a parameter of the system.

7. The system of claim 1, wherein comparing the at least two resources comprises:
    determining term frequency-inverse document frequency (TF-IDF) scores for features shared by the at least two resources;
    adding the TF-IDF scores of features shared by the pair of resources; and
    subtracting the TF-IDF scores of features that are unique to each of the at least two resources.

8. The system of claim 7, further comprising:
    weighting the TF-IDF scores using at least one of:
        resource metadata comparisons; and
        normalized pairs of disparately sized resources.

9. The system of claim 1, wherein merging the at least two resources comprises:
    updating the rare features index to include results of the compared at least two resources, wherein the updating modifies a statistical measure of features for the rare features index.

10. The system of claim 1, wherein merging the at least two resources comprises:
    updating a cached index of differences to include results of the compared at least two resources, wherein the updating does not cause the rare features index to be modified.

11. The system of claim 1, the method further comprising:
    when the similarity threshold is not met, incrementing an attempt count, the attempt count used to test a failure limit.

12. The system of claim 1, the method further comprising:
    executing a post-process, the post-process including:
        comparing one or more unclustered resources from the set of resources to one or more clusters using the similarity threshold; and
        when a likely match possibility is determined, adding the one or more unclustered resources to the one or more clusters.

13. The system of claim 1, wherein the rare features exclude stop words, the stop words being one or more contiguous sequences of items commonly occurring in the set of resources.

14. A method of organizing resources, the method comprising:
    identifying a plurality of features from a set of resources;
    determining one or more of the plurality of features is a rare feature;
    adding the one or more rare features to a rare feature index;
    extracting the one or more rare features from the set of resources;
    identifying at least two resources that share the one or more rare features;
    comparing the at least two resources using a similarity threshold; and
    when the similarity threshold is met, merging the at least two resources into a single cluster.

15. The method of claim 14, wherein identifying the at least two resources comprises:
    randomly selecting one or more rare features from the rare feature index; and randomly selecting the at least two resources that share the one or more rare features.

16. The method of claim 14, wherein merging the at least two resources comprises:
updating the rare features index to include results of the compared at least two resources, wherein the updating modifies a statistical measure of features for the rare features index.

17. The method of claim 14, the method further comprising:
executing a post-process, the post-process including:
comparing one or more unclustered resources from the set of resources to one or more clusters using the similarity threshold; and
when a likely match possibility is determined, adding the one or more unclustered resources to the one or more clusters.

18. A computer storage medium encoding computer executable instructions that, when executed by at least one processor, perform a method of organizing resources, the method comprising:
identifying a plurality of features from a set of resources;
determining one or more of the plurality of features is a rare feature;
adding the one or more rare features to a rare feature index;
extracting the one or more rare features from the set of resources;
identifying at least two resources that share the one or more rare features;
comparing the at least two resources using a similarity threshold; and
when the similarity threshold is met, merging the at least two resources into a single cluster.

19. The computer storage medium of claim 18, wherein determining the rare feature comprises determining at least one of:
a number of times a feature is found in a resource, and
a number of times the feature is found in the set of resources.

20. The computer storage medium of claim 18, the method further comprising:
when the similarity threshold is not met, incrementing an attempt count, the attempt count used to test a failure limit.

* * * * *